(12) United States Patent
Shi et al.

(10) Patent No.: US 9,204,292 B2
(45) Date of Patent: Dec. 1, 2015

(54) METHODS AND APPARATUS FOR SERVICE PROVISIONING IN WIRELESS COMMUNICATION NETWORKS

(75) Inventors: Guangming Carl Shi, San Diego, CA (US); Kuo-Chun Lee, San Diego, CA (US); Steven Cheng, San Diego, CA (US); Isaac Ta-yan Siu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1652 days.

(21) Appl. No.: 12/254,781

(22) Filed: Oct. 20, 2008

(65) Prior Publication Data

US 2010/0098035 A1    Apr. 22, 2010

(51) Int. Cl.
| | |
|---|---|
| H04W 4/00 | (2009.01) |
| H04W 8/26 | (2009.01) |
| H04L 12/24 | (2006.01) |
| H04W 8/20 | (2009.01) |
| H04W 48/18 | (2009.01) |

(52) U.S. Cl.
CPC .......... *H04W 8/265* (2013.01); *H04L 41/5054* (2013.01); *H04W 8/20* (2013.01); *H04W 48/18* (2013.01)

(58) Field of Classification Search
CPC ..... H04W 60/00; H04W 60/02; H04W 60/04; H04W 60/06; H04W 60/005
USPC ................ 455/435.1, 435.3, 435.2, 410, 411; 370/342, 338
See application file for complete search history.

(56) References Cited

U.S. PATENT DOCUMENTS

| | | | |
|---|---|---|---|
| 6,625,451 B1 * | 9/2003 | La Medica et al. .......... 455/434 |
| 6,748,439 B1 | 6/2004 | Monachello et al. | |
| 7,266,371 B1 * | 9/2007 | Amin et al. .................... 455/419 |
| 2003/0069965 A1 * | 4/2003 | Ma et al. ....................... 709/225 |
| 2003/0101246 A1 | 5/2003 | Lahti | |
| 2005/0002335 A1 | 1/2005 | Adamczyk et al. | |
| 2005/0083899 A1 * | 4/2005 | Babbar et al. ................. 370/342 |

(Continued)

FOREIGN PATENT DOCUMENTS

| | | |
|---|---|---|
| CN | 101080087 A | 11/2007 |
| JP | 2005328520 A | 11/2005 |

(Continued)

OTHER PUBLICATIONS

International Search Report and Written Opinion—PCT/US2009/060222—International Search Authority, European Patent Office, Jun. 28, 2010.

(Continued)

*Primary Examiner* — Mazda Sabouri

(57) ABSTRACT

An open service provisioning method may be implemented by a terminal. The method may include receiving a customer's selection of a first-time network access provider and network service provider (NAP/NSP). The method may also include establishing a connection with the first-time NAP/NSP. The method may also include receiving information about possible other NAPs/NSPs while connected to the first-time NAP/NSP. The method may also include receiving the customer's selection of a home NAP/NSP. The method may also include assisting the customer to sign up for service with the home NAP/NSP. The method may further include establishing a connection with the home NAP/NSP.

30 Claims, 11 Drawing Sheets

(56) References Cited

U.S. PATENT DOCUMENTS

| | | | |
|---|---|---|---|
| 2005/0154913 A1* | 7/2005 | Barriga et al. | 713/201 |
| 2005/0177733 A1* | 8/2005 | Stadelmann et al. | 713/185 |
| 2005/0239497 A1 | 10/2005 | Bahl et al. | |
| 2007/0286120 A1 | 12/2007 | Dang | |
| 2008/0133606 A1 | 6/2008 | Dang et al. | |
| 2008/0151851 A1 | 6/2008 | Sitch | |
| 2008/0165943 A1* | 7/2008 | Gonzalez Lopez et al. | 379/201.12 |
| 2008/0171532 A1* | 7/2008 | Shieh et al. | 455/410 |
| 2008/0172381 A1* | 7/2008 | Suh | 707/5 |
| 2008/0177998 A1* | 7/2008 | Apsangi et al. | 713/155 |
| 2011/0070877 A1* | 3/2011 | Macaluso | 455/419 |

FOREIGN PATENT DOCUMENTS

| | | |
|---|---|---|
| JP | 2008510370 A | 4/2008 |
| JP | 2008207457 A | 9/2008 |
| WO | 2006019599 A2 | 2/2006 |
| WO | WO2008068608 | 6/2008 |

OTHER PUBLICATIONS

European Search Report—EP12160435—Search Authority—The Hague—Apr. 3, 2010.

Taiwan Search Report—TW098134516—TIPO—Feb. 1, 2013.

* cited by examiner

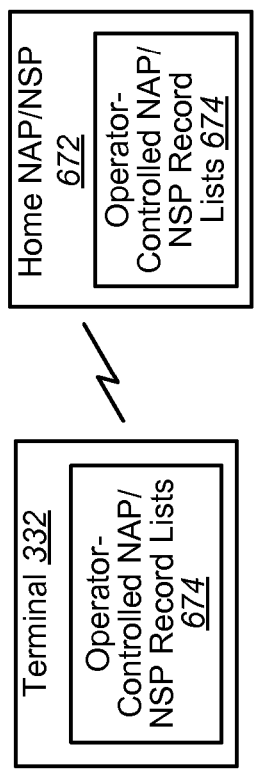
FIG. 6
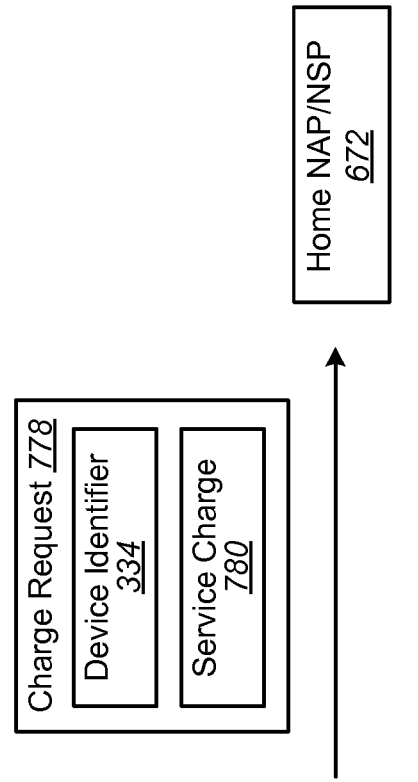
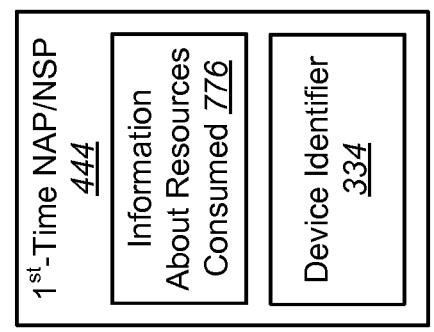
FIG. 7

METHODS AND APPARATUS FOR SERVICE PROVISIONING IN WIRELESS COMMUNICATION NETWORKS

TECHNICAL FIELD

The present disclosure relates generally to communication systems. More specifically, the present disclosure relates to methods and apparatus for service provisioning in wireless communication networks.

BACKGROUND

As used herein, the term "terminal" refers to an electronic device that may be used for voice and/or data communication over a wireless communication network. Examples of terminals include cellular phones, personal digital assistants (PDAs), handheld devices, wireless modems, laptop computers, personal computers (PCs), PC cards, etc. A terminal may alternatively be referred to as a mobile station, an access terminal, a mobile terminal, a subscriber station, a remote station, a user terminal, a subscriber unit, user equipment, etc.

A wireless communication network may provide communication for a number of terminals, each of which may be serviced by a base station. A base station may alternatively be referred to as an access point, a Node B, or some other terminology.

A terminal may communicate with one or more base stations via transmissions on the uplink and the downlink. The uplink (or reverse link) refers to the communication link from the terminal to the base station, and the downlink (or forward link) refers to the communication link from the base station to the terminal.

The resources of a wireless communication network (e.g., bandwidth and transmit power) may be shared among multiple mobile devices. A variety of multiple access techniques are known, including code division multiple access (CDMA), time division multiple access (TDMA), frequency division multiple access (FDMA), orthogonal frequency division multiple access (OFDMA), single-carrier frequency division multiple access (SC-FDMA), and so forth.

Benefits may be realized by improved methods and apparatus related to the operation of wireless communication networks.

BRIEF DESCRIPTION OF THE DRAWINGS

FIG. 6 illustrates certain additional aspects of an open service provisioning system in accordance with the present disclosure;

FIG. 7 illustrates certain additional aspects of an open service provisioning system in accordance with the present disclosure;

SUMMARY

Figure 1:
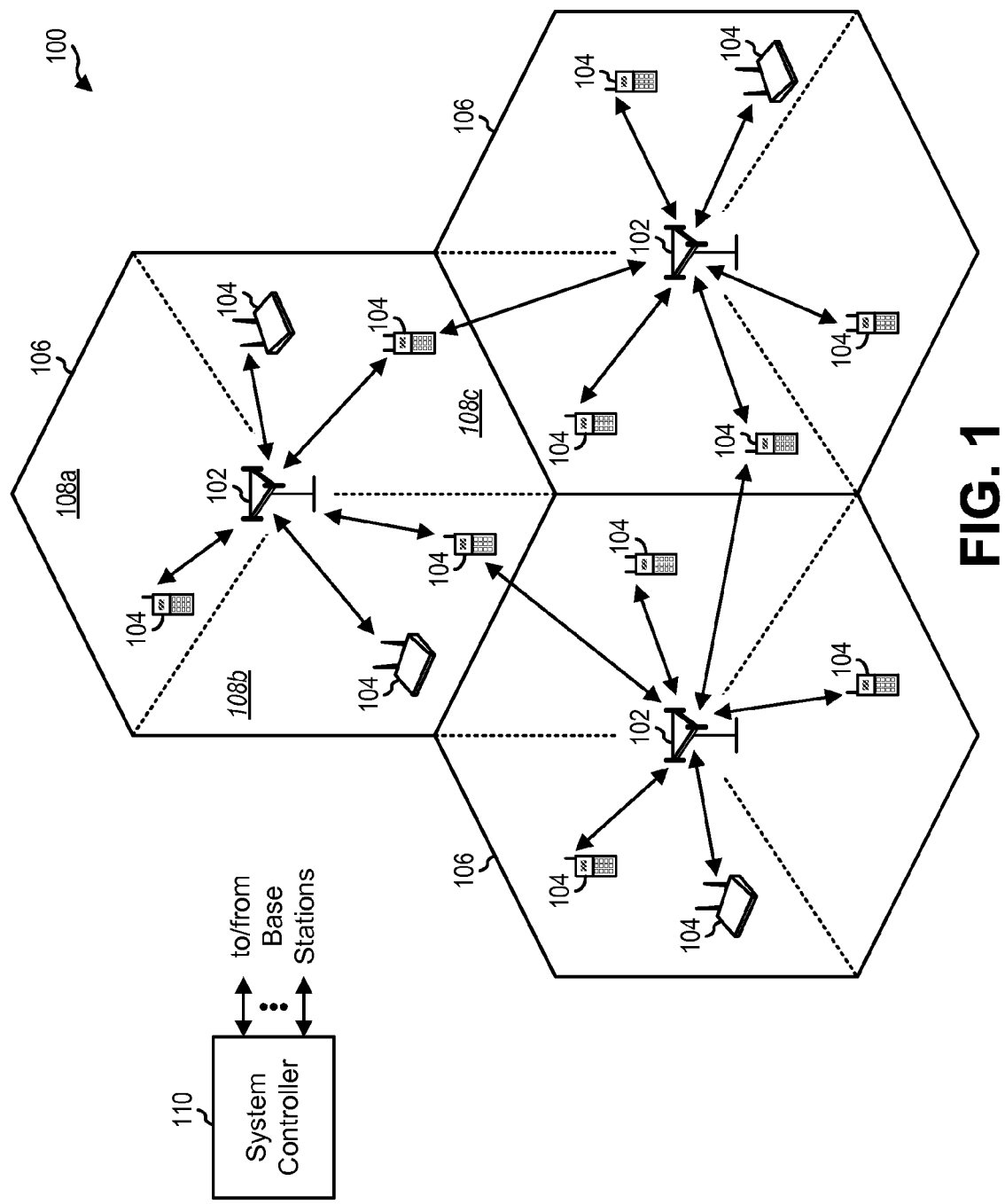
FIG. 1 illustrates a wireless communication system with multiple base stations and multiple terminals.

An open service provisioning method is disclosed. The method may be implemented by a terminal. The method may include receiving a customer's selection of a first-time network access provider and network service provider (NAP/NSP). The method may also include establishing a connection with the first-time NAP/NSP. The method may also include receiving information about possible other NAPs/NSPs while connected to the first-time NAP/NSP. The method may also include receiving the customer's selection of a home NAP/NSP. The method may also include assisting the customer to sign up for service with the home NAP/NSP. The method may also include establishing a connection with the home NAP/NSP.

A terminal configured for open service provisioning is disclosed. The terminal may include a processor. The terminal may also include memory in electronic communication with the processor. The terminal may also include instructions stored in the memory. The instructions may be executable by the processor to receive a customer's selection of a first-time network access provider and network service provider (NAP/NSP). The instruction may also be executable to establish a connection with the first-time NAP/NSP. The instructions may also be executable to receive information about possible other NAPs/NSPs while connected to the first-time NAP/NSP. The instructions may also be executable to receive the customer's selection of a home NAP/NSP. The instructions may also be executable to assist the customer to sign up for service with the home NAP/NSP. The instructions may further be executable to establish a connection with the home NAP/NSP.

A terminal configured for open service provisioning is disclosed. The terminal may include means for receiving a customer's selection of a first-time network access provider and network service provider (NAP/NSP). The terminal may also include means for establishing a connection with the first-time NAP/NSP. The terminal may also include means for receiving information about possible other NAPs/NSPs while connected to the first-time NAP/NSP. The terminal may also include means for receiving the customer's selection of a home NAP/NSP. The terminal may also include means for assisting the customer to sign up for service with the home NAP/NSP. The terminal may also include means for establishing a connection with the home NAP/NSP.

A computer-program product for open service provisioning by a terminal is disclosed. The computer-program product may include a computer-readable medium having instructions thereon. The instructions may include code for receiving a customer's selection of a first-time network access provider and network service provider (NAP/NSP). The instructions may also include code for establishing a connection with the first-time NAP/NSP. The instructions may also include code for receiving information about possible other NAPs/NSPs while connected to the first-time NAP/NSP. The instructions may also include code for receiving the customer's selection of a home NAP/NSP. The instructions may also include code for assisting the customer to sign up for service with the home NAP/NSP. The instructions may also include code for establishing a connection with the home NAP/NSP.

An over-the-air service provisioning method is disclosed. The method may be implemented by a terminal. The method may include receiving service provisioning information that comprises NAP/NSP record lists. The method may also include receiving an Internet Protocol (IP) address. The method may also include using the service provisioning information to create a service flow. The method may also include using the IP address to establish IP data communication. The method may be performed the first time that a customer uses the terminal.

A terminal configured for over-the-air service provisioning is disclosed. The terminal may include a processor. The terminal may also include memory in electronic communication with the processor. The terminal may also include instructions stored in the memory. The instructions may be executable by the processor to receive service provisioning information that comprises NAP/NSP record lists. The instructions may also be executable to receive an Internet Protocol (IP) address. The instructions may also be executable to use the service provisioning information to create a service flow. The instructions may also be executable to use the IP address to establish IP data communication. The recited acts may be performed the first time that a customer uses the terminal.

A terminal configured for over-the-air service provisioning is disclosed. The terminal may include means for receiving service provisioning information that comprises NAP/NSP record lists. The terminal may also include means for receiving an Internet Protocol (IP) address. The terminal may also include means for using the service provisioning information to create a service flow. The terminal may also include means for using the IP address to establish IP data communication. The recited acts may be performed the first time that a customer uses the terminal.

A computer-program product for over-the-air service provisioning by a terminal is disclosed. The computer-program product may include a computer-readable medium having instructions thereon. The instructions may include code for receiving service provisioning information that comprises NAP/NSP record lists. The instructions may also include code for receiving an Internet Protocol (IP) address. The instructions may also include code for using the service provisioning information to create a service flow. The instructions may also include code for using the IP address to establish IP data communication. The recited acts may be performed the first time that a customer uses the terminal.

In certain embodiments, the methods and apparatuses presented above can be configured for operation in a wireless communication network that supports an Institute of Electronic and Electrical Engineers (IEEE) 802.16 standard

DETAILED DESCRIPTION

The techniques described herein may be used for various communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

FIG. 1 shows a wireless communication system 100 with multiple base stations (BS) 102 and multiple terminals 104. A base station 102 is a station that communicates with the terminals 104. A base station 102 may also be called, and may contain some or all of the functionality of, an access point, a Node B, an evolved Node B, etc. Each base station 102 provides communication coverage for a particular geographic area 106. The term "cell" can refer to a base station 102 and/or its coverage area 106 depending on the context in which the term is used. To improve system capacity, a base station coverage area 106 may be partitioned into multiple smaller areas, e.g., three smaller areas 108a, 108b, and 108c. Each smaller area 108a, 108b, 108c may be served by a respective base transceiver station (BTS). The term "sector" can refer to a BTS and/or its coverage area 108 depending on the context in which the term is used. For a sectorized cell, the BTSs for all sectors of that cell are typically co-located within the base station 102 for the cell.

Terminals 104 are typically dispersed throughout the system 100. A terminal 104 may also be called, and may contain some or all of the functionality of, a mobile station, an access terminal, a user equipment, a subscriber unit, a station, etc. A terminal 104 may be a cellular phone, a personal digital assistant (PDA), a wireless device, a wireless modem, a handheld device, a laptop computer, etc. A terminal 104 may communicate with zero, one, or multiple base stations 104 on the downlink (DL) and/or uplink (UL) at any given moment. The downlink (or forward link) refers to the communication link from the base stations 102 to the terminals 104, and the uplink (or reverse link) refers to the communication link from the terminals 104 to the base stations 102.

For a centralized architecture, a system controller 110 may couple to base stations 102 and provide coordination and control for these base stations 102. The system controller 110 may be a single network entity or a collection of network entities. For a distributed architecture, base stations 102 may communicate with one another as needed.

Figure 2:
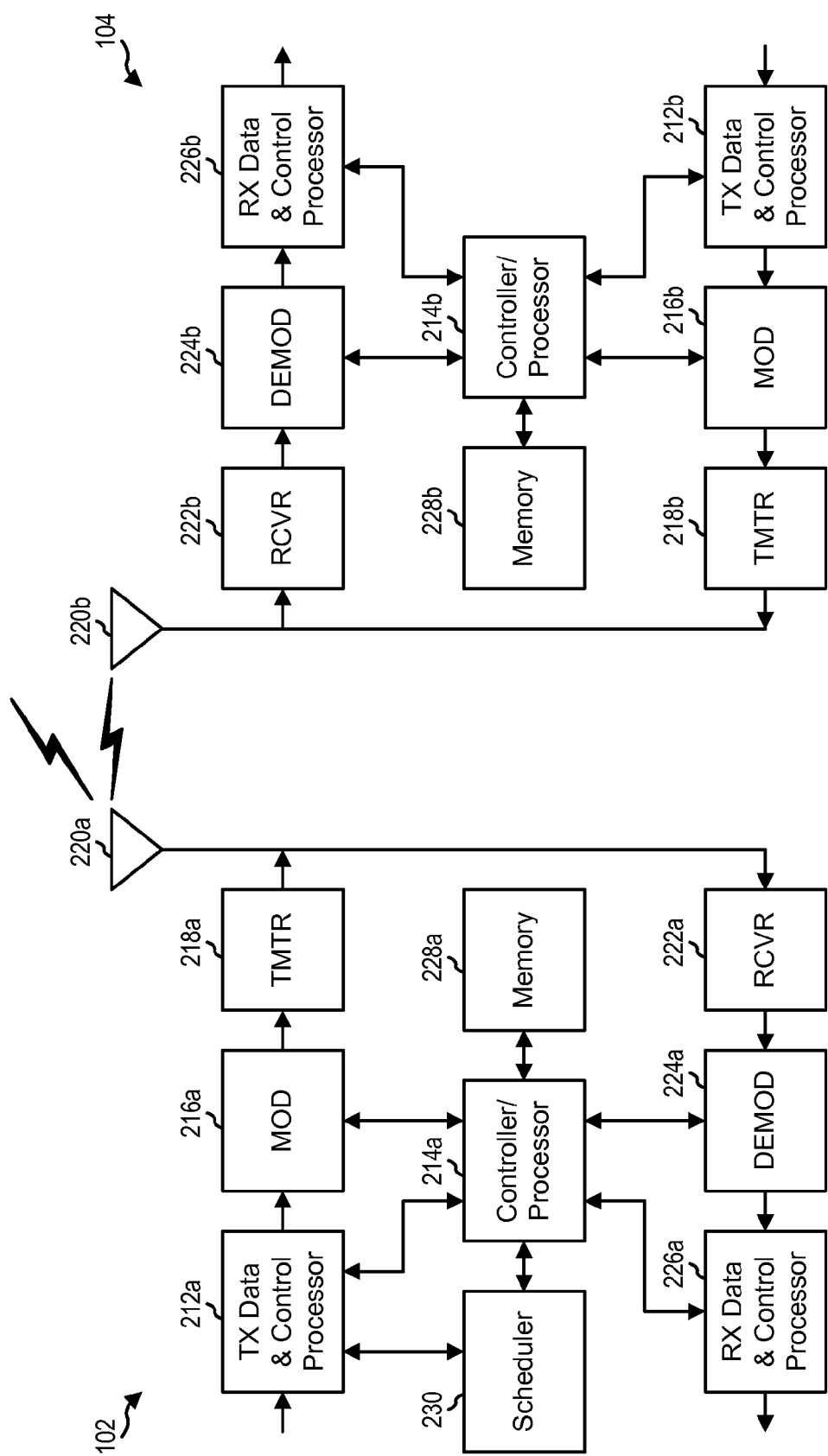
FIG. 2 illustrates a block diagram of a design of a base station and a terminal.

FIG. 2 shows a block diagram of a design of a base station 102 and a terminal 104, which may be one of the base stations 102 and one of the terminals 104 in FIG. 1. At the base station 102, a transmit (TX) data and control processor 212a may receive traffic data from a data source (not shown) and/or control information from a controller/processor 214a. The processor 212a may process (e.g., format, encode, interleave, and symbol map) the traffic data and control information and provide modulation symbols. A modulator (MOD) 216a may process the modulation symbols (e.g., for OFDM) and provide output chips. A transmitter (TMTR) 218a may process (e.g., convert to analog, amplify, filter, and upconvert) the output chips and generate a downlink signal, which may be transmitted via an antenna 220a.

At the terminal 104, an antenna 220b may receive the downlink signals from the base station 102 and other base stations 102 and may provide a received signal to a receiver (RCVR) 222b. The receiver 222b may condition (e.g., filter, amplify, downconvert, and digitize) the received signal and provide received samples. A demodulator (DEMOD) 224b may process the received samples (e.g., for OFDM) and provide demodulated symbols. A receive (RX) data and control processor 226b may process (e.g., symbol demap, deinterleave, and decode) the demodulated symbols to obtain decoded data and control information for the terminal 104.

On the uplink, at the terminal 104, data and control information to be sent by the terminal 104 may be processed by a TX data and control processor 212b, modulated by a modulator 216b, conditioned by a transmitter 218b, and transmitted via an antenna 220b. At the base station 102, the uplink signals from the terminal 104 and possibly other terminals 104 may be received by an antenna 220a, conditioned by a receiver 222a, demodulated by a demodulator 224a, and processed by an RX data and control processor 226a to recover the data and control information sent by the terminal 104. In general, the processing for uplink transmission may be similar to or different from the processing for downlink transmission.

Controllers/processors 214a and 214b may direct the operation at the base station 102 and the terminal 104, respectively. Memories 228a and 228b may store data and program codes for the base station 102 and the terminal 104, respectively. A scheduler 230 may schedule terminals 104 for downlink and/or uplink transmission and may provide assignments of system resources.

The methods and apparatus of the present disclosure may be utilized in a broadband wireless communication network. The term "broadband wireless" refers to technology that provides wireless, voice, Internet, and/or data network access over a given area.

The Institute of Electronic and Electrical Engineers (IEEE) 802.16 Working Group on Broadband Wireless Access Standards aims to prepare formal specifications for the global deployment of broadband Wireless Metropolitan Area Networks. Although the 802.16 family of standards is officially called WirelessMAN, it has been called "WiMAX" (which stands for the "Worldwide Interoperability for Microwave Access") by an industry group called the WiMAX Forum. Thus, the term "WiMAX" refers to a standards-based broadband wireless technology that provides high-throughput broadband connections over long distances.

Some of the examples described herein are relevant to wireless communication networks that are configured in accordance with WiMAX standards. However, these examples should not be interpreted as limiting the scope of the present disclosure.

WiMAX is based on OFDM (orthogonal frequency division multiplexing) and OFDMA (orthogonal frequency division multiple access) technology. OFDM is a digital multi-carrier modulation technique that has recently found wide adoption in a variety of high-data-rate communication networks. With OFDM, a transmit bit stream is divided into multiple lower-rate substreams. Each substream is modulated with one of multiple orthogonal subcarriers and sent over one of a plurality of parallel subchannels. OFDMA is a multiple access technique in which users are assigned subcarriers in different time slots. OFDMA is a flexible multiple-access technique that can accommodate many users with widely varying applications, data rates, and quality of service requirements.

Exemplary Open Service Provisioning

In the existing cellular service provisioning model, the customer first signs a contract with a service provider before receiving the terminal hardware. However, this is neither open nor flexible to the customer. Once the service provider is chosen, the customer is not permitted to change the home service provider. In addition, the service provider has complete control over which roaming networks the customer is permitted to use, because the terminal can be provisioned with a Network Access Provider (NAP) record list and a Network Service Provider (NSP) record list according to the service provider's own interest.

In some wireless communication networks (e.g., WiMAX networks), two different types of NAP/NSP record lists may be provided: user-controlled lists and operator-controlled lists. The user-controlled lists may be given precedence over the operator-controlled lists.

An NAP record list may include a list of NAP records in order of priority. Each NAP record may include channel information (e.g., band class, frequency assignment index, bandwidth, etc.), an NAP identifier, an NAP verbose name, etc. Similarly, an NSP record list may include a list of NSP records in order of priority. Each NSP record may include priority information, an NSP identifier, an NSP verbose name, etc.

One aspect of the present disclosure relates to a service activation method whereby the customer can freely choose NAPs and NSPs. In accordance with the present disclosure, the terminal can be provisioned with the user-controlled NAP/NSP lists and the operator-controlled NAP/NSP lists after the customer has had the opportunity to choose the NAPs and NSPs.

In the present disclosure, the term "Network Access Provider" (NAP) refers to an entity that provides a physical link to a wireless communication network. The term "Network Service Provider" (NSP) refers to an entity that provides services (e.g., Internet Protocol television (IPTV), 3D gaming, World Wide Web access, email, instant messaging, Voice over IP (VoIP), etc.) via a wireless communication network. The term "NAP/NSP" refers to an NAP, an NSP, or a combination of an NAP and an NSP. An NAP and an NSP can be the same entity or different entities. Thus, the term "NAP/NSP" may refer to a single entity (e.g., an entity that functions as an NAP, an NSP, or both an NAP and an NSP), or the term "NAP/NSP" may refer to multiple entities (e.g., one entity that functions as an NAP, and another entity that functions as an NSP).

FIGS. 3 through 7 illustrate an example of an open service provisioning system in accordance with the present disclosure. The open service provisioning system discussed herein may be applicable to a terminal 332 that is configured for operation in a wireless communication network that supports an Institute of Electronic and Electrical Engineers (IEEE) 802.16 standard. However, scope of the present disclosure should not be limited to IEEE 802.16; the techniques disclosed herein may be useful in other types of wireless communication networks as well.

Figure 3:
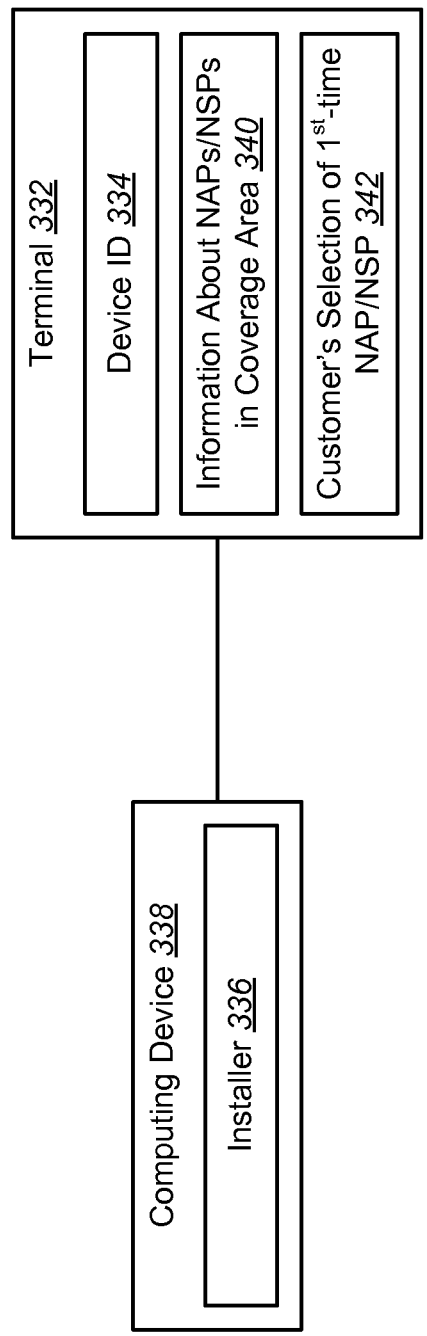
FIG. 3 illustrates certain aspects of an open service provisioning system in accordance with the present disclosure.

Reference is initially made to FIG. 3. In accordance with the present disclosure, when a customer purchases a terminal 332 in a retail store, the terminal 332 may have a device identifier 334 (e.g., a MAC address) programmed therein. However, the terminal 332 may not have NAP/NSP record lists or a sign-on identity.

The customer may be given an installer 336. The installer 336 may be located on a storage device (e.g., a compact disc (CD), flash drive, etc.) that is provided to the customer separately from the terminal 332. Alternatively, the installer 336 may be located on the terminal 332 itself.

The first time that the customer uses the terminal 332, the customer may run the installer 336. There are many possible ways for the customer to run the installer 336. For example, if the installer 336 is provided on an installation CD, and if the terminal 332 is a personal computer (PC) card, then the PC card may be plugged into a notebook PC where the installation CD can run. As another example, if the terminal 332 is a smart phone, the smart phone can be connected to a desktop or notebook PC via a communication port (e.g., a Universal Serial Bus (USB) port), and then the installation CD can run on the PC. As another example, if the installer 336 is located on the terminal 332, then the installer 336 may run directly on the terminal 332. In FIG. 3, the installer 336 is shown running on a computing device 338 that is in electronic communication with the terminal 332.

The installer 336 may cause the terminal 332 to attempt to access a wireless communication network. Initially, the installer 336 may cause the terminal 332 to determine information 340 about available NAPs and NSPs, i.e., to identify which NAPs and NSPs are located within the coverage area of the terminal 332. The terminal 332 may display this information 340 to the user, and prompt the user to select the NAP and the NSP that will be used to provide network connectivity during the first time that the terminal 332 is used. The NAP and the NSP that are used in this manner may be referred to as the first-time NAP/NSP. The customer's selection 342 of the first-time NAP/NSP may be received by the terminal 332 via a user interface of the terminal 332.

Figure 4:
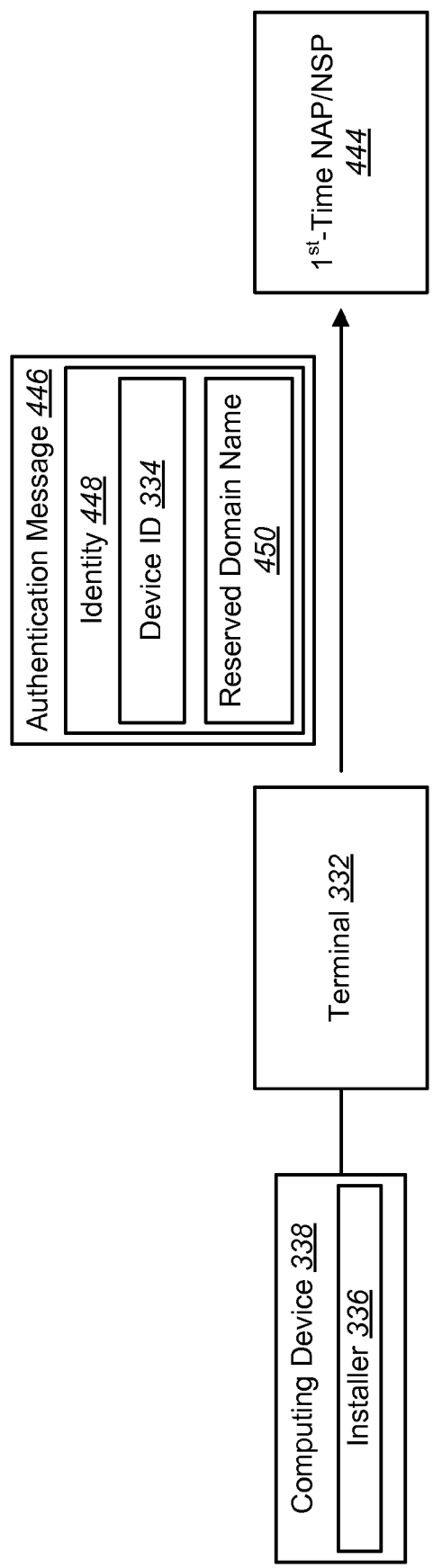
FIG. 4 illustrates certain additional aspects of an open service provisioning system in accordance with the present disclosure.

Reference is now made to FIG. 4. When the customer's selection 342 of the first-time NAP/NSP 444 has been made, then the terminal 332 may establish a connection with the first-time NAP/NSP 444. As part of this process of establishing a connection with the first-time NAP/NSP 444, the terminal 332 may provide information that causes the first-time NAP/NSP 444 to bypass authentication. For example, if authentication is performed in accordance with the Privacy Key Management protocol, version 2 (PKMv2), the terminal 332 may be asked to provide an identity 448 for authentication. The installer 336 may configure the terminal 332 to use DeviceID@ReservedDomain.com as the identity 448, where DeviceID is a device identifier 334 (e.g., a MAC address for the terminal 332), and ReservedDomain is a reserved domain name 450 that allows the first-time NAP/NSP 444 to recognize the first-time log-on and bypass authentication. One example of a reserved domain name 450 that may be used is "initialization". The specific reserved domain name 450 that is used may be specified by a standards organization.

When the first-time NAP/NSP 444 (e.g., the Access Services Network (ASN) of the first-time NAP) receives the authentication message 446, the first-time NAP/NSP 444 may be configured to bypass authentication if it detects the reserved domain name 450. The terminal 332 may then proceed with registration and pre-provisioned service flow creation.

Figure 5:
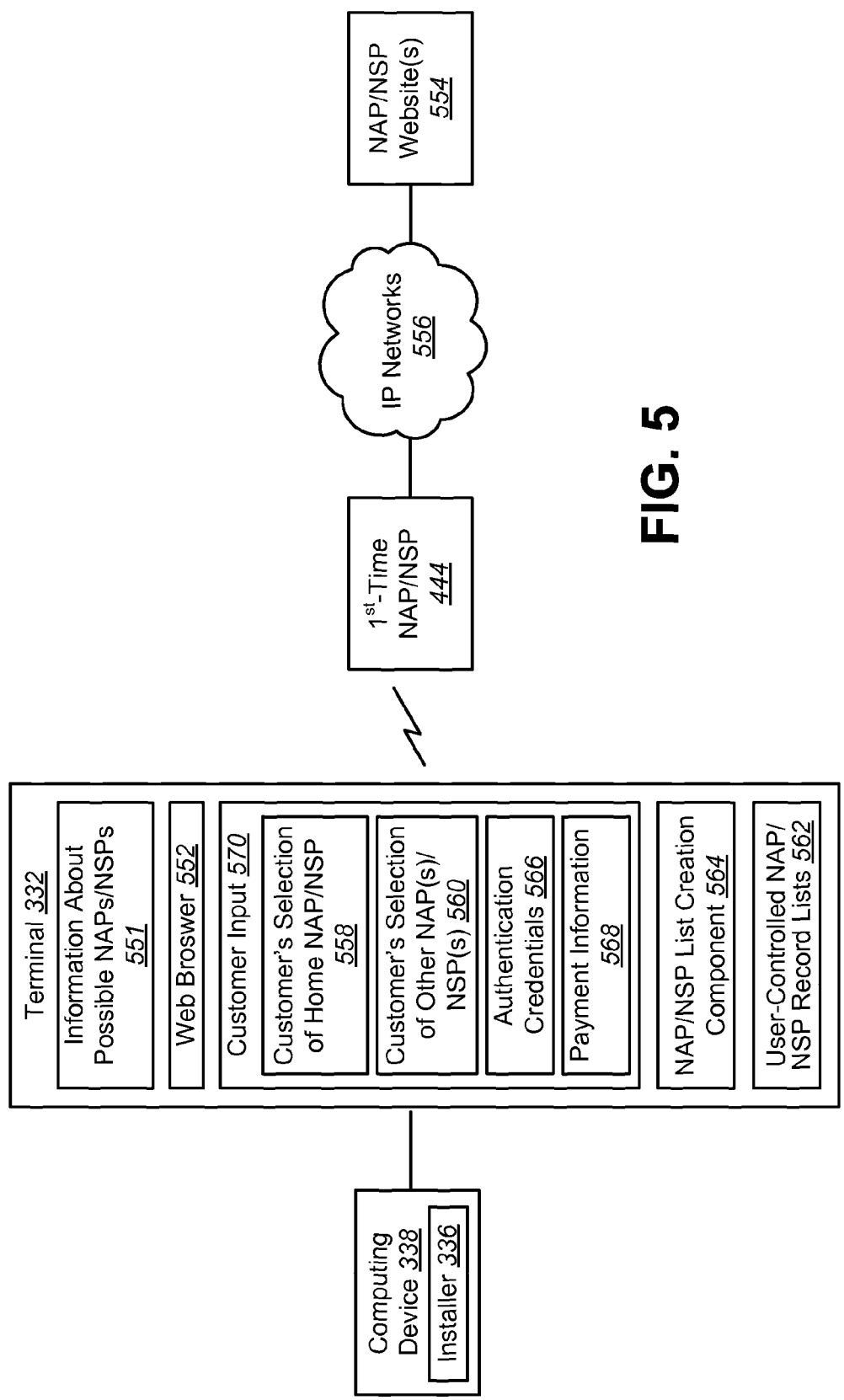
FIG. 5 illustrates certain additional aspects of an open service provisioning system in accordance with the present disclosure.

Reference is now made to FIG. 5. After creating the pre-provisioned service flow, then the terminal 332 may receive information 551 about possible NAPs and NSPs that may be used by the terminal 332. Information 551 may be determined about a wide variety of NAPs/NSPs, regardless of whether the NAPs/NSPs are currently located within the coverage area of the terminal 332. A web browser 552 on the terminal 332 may connect to one or more websites 554 that include this information 551. The first-time NAP/NSP 444 may facilitate a connection with the websites 554 via one or more IP networks 556. The customer may view the information 551 and compare the various NAPs and NSPs.

The information 551 about possible NAPs and NSPs may be communicated (e.g., displayed) to the customer via a user interface of the terminal 332. The customer may be prompted to make a selection 558 of a home NAP/NSP. The customer may also be prompted to make a selection 560 of one or more other NAPs/NSPs in addition to the home NAP/NSP.

User-controlled NAP/NSP record lists 562 may be created based on the customer's selection 558 of the home NAP/NSP and the customer's selection 560 of the other NAP(s)/NSP(s). The terminal 332 is shown with an NAP/NSP list creation component 564 for providing the functionality of creating the user-controlled NAP/NSP record lists 562.

The terminal 332 may also prompt for and receive authentication credentials 566 from the customer for use in authenticating with the home NAP/NSP. The authentication credentials 566 may include a sign-on identity (e.g., a username) and a password. The terminal 332 may also prompt for and receive payment information 568 (e.g., a credit card number, contact information for billing purposes, etc.) from the customer. The installer 336 may assist the customer to sign up for service with the selected home NAP/NSP. This may involve transmitting relevant sign-up information, such as the authentication credentials 566 and the payment information 568, to one or more NAP/NSP websites 554. A secure communication protocol (e.g., HTTPS) may be used for these communications.

Reference is now made to FIG. 6. At some point after the home NAP/NSP 672 has been chosen and the customer has signed up for service from the home NAP/NSP 672, then the terminal 332 may establish a connection with the home NAP/NSP 672. When the terminal 332 has established a connection with the home NAP/NSP 672, then the terminal 332 may download operator-controlled NAP/NSP record lists 674. The operator-controlled NAP/NSP record lists 674 may be similar to the user-controlled NAP/NSP record lists, except that the operator of the home NAP/NSP 672 decides which NAP/NSP records are included in the operator-controlled NAP/NSP record lists 674.

Reference is now made to FIG. 7. In accordance with the procedures discussed above, a terminal 332 may initially obtain service via a first-time NAP/NSP 444. The first-time NAP/NSP 444 can record information 776 about the resources that were consumed by the terminal 332 during this time. This information 776 may include the amount of time that the terminal 332 was connected to the first-time NAP/NSP 444, the amount of data that was transmitted by the terminal 332 via the first-time NAP/NSP 444, etc. The information 776 about the resources that were consumed may be associated with the device identifier 334 (e.g., MAC address) for the terminal 332.

At some point after service provisioning of the terminal 332 has been completed, the first-time NAP/NSP 444 may send a charge request 778 to the home NAP/NSP 672. The charge request 778 may include the device identifier 334 for the terminal 332, as well as a service charge 780 (i.e., an amount of money that the first-time NAP/NSP 444 is charging for the resources that were consumed). The home NAP/NSP 672 may collect the service charge 780 from the customer, and then forward this payment to the first-time NAP/NSP 444.

As an alternative to the procedure shown in FIG. 7, the first-time NAP/NSP 444 can request payment information 568 (e.g., a credit card number) for the service charge 780 before allowing the customer to proceed with the next step in service activation. In this situation, the first-time NAP/NSP 444 does not need to bill the home NAP/NSP 672 for the service charge 780.

If at any point the customer decides that he or she does not like the current home NAP/NSP 672, the customer can de-select the home NAP/NSP 672 and re-select a new home NAP/NSP 672. This may be accomplished by running the installer 336 in the manner described above.

Figure 8:
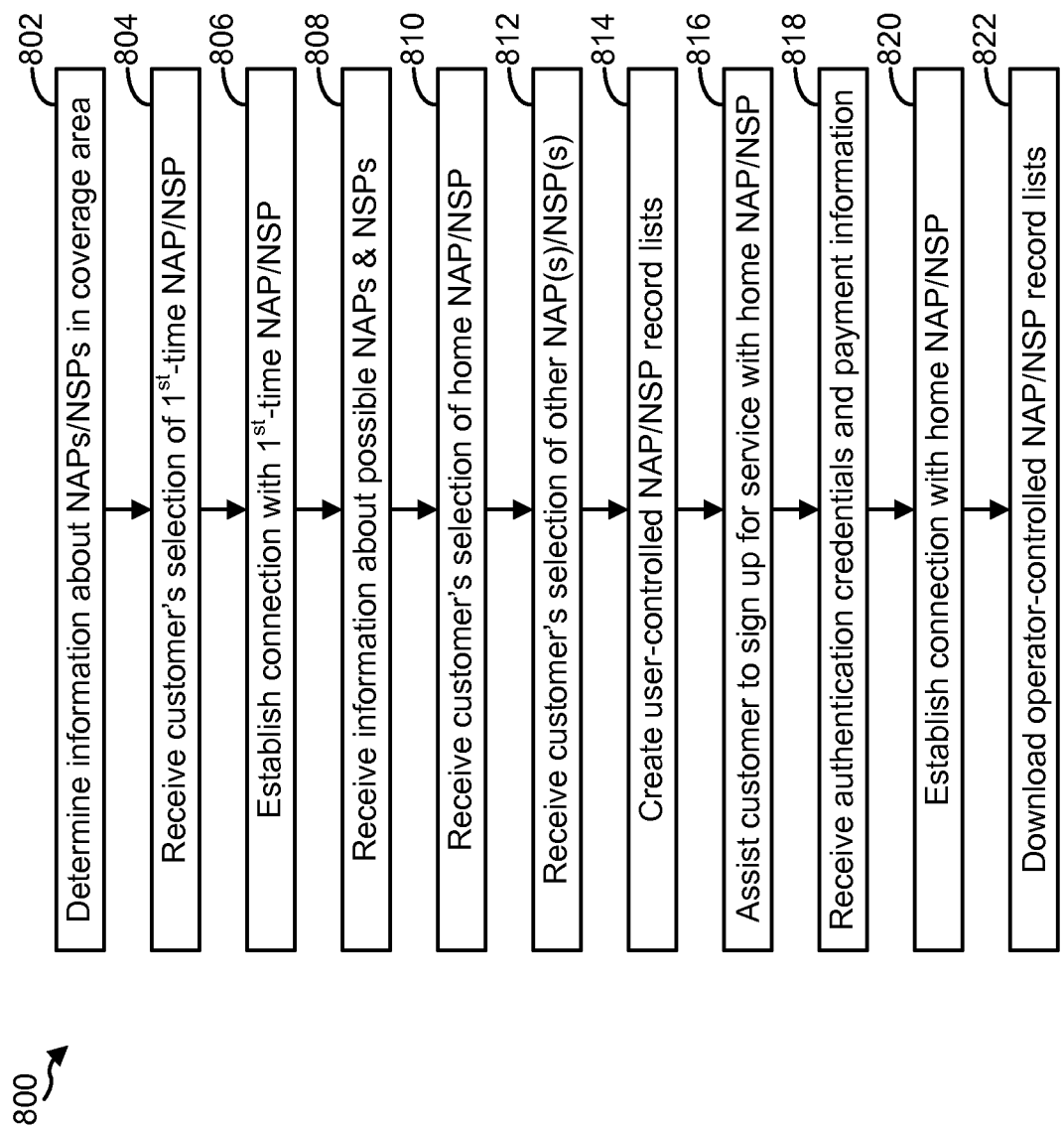
FIG. 8 illustrates an example of an open service provisioning method in accordance with the present disclosure.

Reference is now made to FIG. 8. FIG. 8 illustrates an example of an open service provisioning method 800 in accordance with the present disclosure. The method 800 may be performed by a terminal 332. The method 800 may be performed the first time that the customer uses the terminal 332 to access a wireless communication network.

As indicated above, in accordance with the present disclosure, when a customer purchases a terminal 332 in a retail store, the terminal 332 may have a device identifier 334 (e.g., a MAC address) programmed therein. However, the terminal 332 may not have NAP/NSP record lists 562, 674 or a sign-on identity 448. The method 800 may include determining 802 information 340 about NAPs and NSPs that are located within the coverage area of the terminal 332, and receiving 804 a customer's selection 342 of first-time NAP/NSP 444. The method 800 may also include establishing 806 a connection with the first-time NAP/NSP 444. As part of this process of connecting to the first-time NAP/NSP 444, the terminal 332 may provide information that causes the first-time NAP/NSP 444 to bypass authentication.

When the terminal 332 has established 806 a connection with the first-time NAP/NSP 444, the terminal 332 may receive 808 information 551 about possible NAPs and NSPs that may be used by the terminal 332. A web browser 552 on the terminal 332 may connect to one or more websites 554 that include this information 551. This information 551 may be communicated (e.g., displayed) to the customer, and the customer may view the information 551 and compare the various NAPs and NSPs.

The customer's selection 558 of the home NAP/NSP may be received 810. In addition, the customer's selection 560 of one or more other NAP(s)/NSP(s) may be received 812. User-controlled NAP/NSP record lists 562 may be created 814 based on the customer's selection 558 of the home NAP/NSP and the customer's selection 560 of the other NAP(s)/NSP(s).

The method 800 may include assisting 816 the customer to sign up for service with the selected home NAP/NSP 672. This may involve receiving 818 authentication credentials 566 and payment information 568 from the customer for the home NAP/NSP 672. This may also involve transmitting relevant sign-up information, such as the authentication credentials 566 and the payment information 568, to one or more NAP/NSP websites 554. The method 800 may also include establishing 820 a connection with the home NAP/NSP 672. At this point, operator-controlled NAP/NSP record lists 674 may be downloaded 822 from the home NAP/NSP 672.

Figure 9:
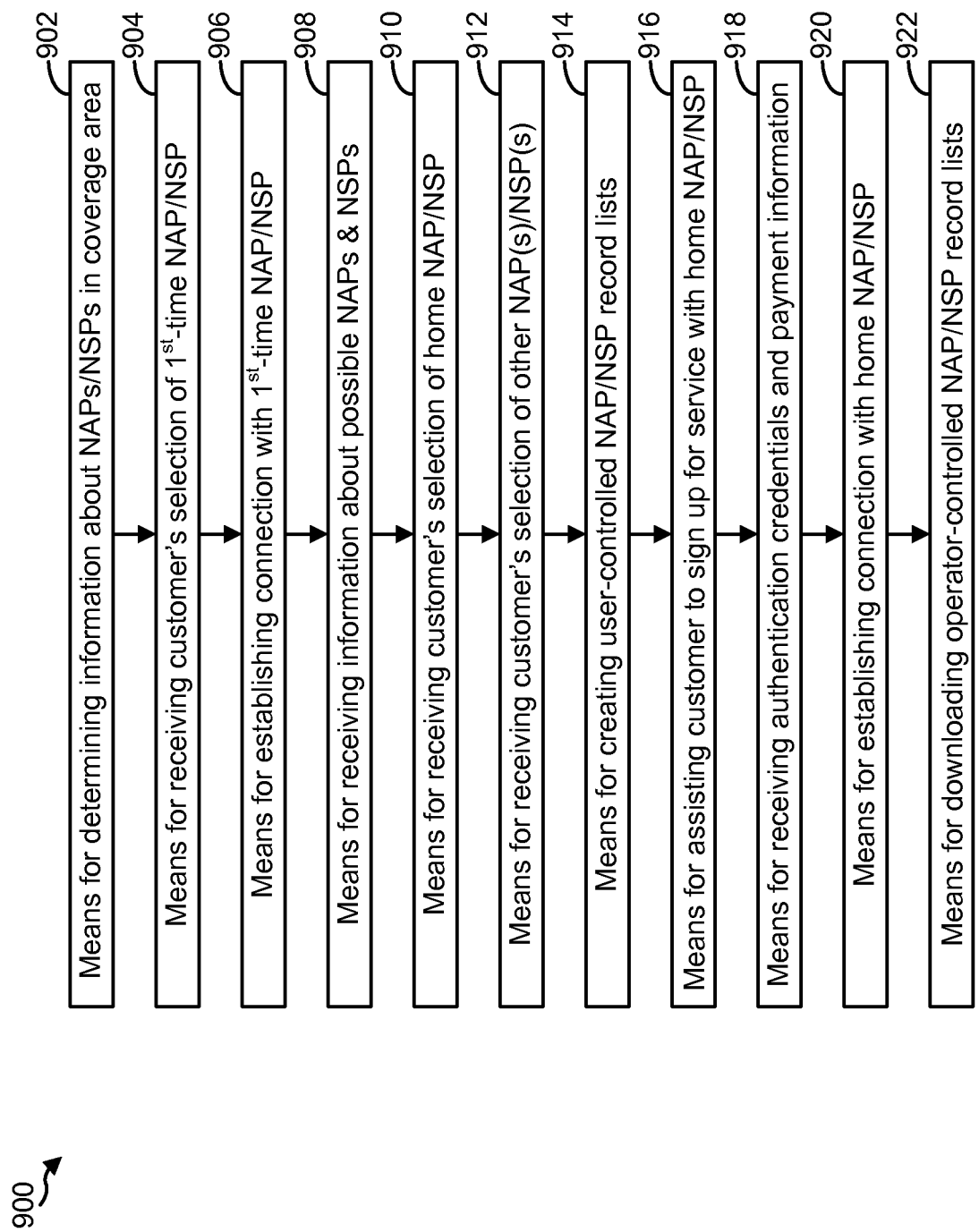
FIG. 9 illustrates means-plus-function blocks corresponding to the method of FIG. 8.

The method 800 of FIG. 8 described above may be performed by various hardware and/or software component(s) and/or module(s) corresponding to the means-plus-function blocks 900 illustrated in FIG. 9. In other words, blocks 802 through 822 illustrated in FIG. 8 correspond to means-plus-function blocks 902 through 922 illustrated in FIG. 9.

The service activation procedures described above may provide a number of advantages relative to known approaches. For example, the proposed procedures may allow a customer to choose a home NAP/NSP 672 during service activation. In addition, the proposed procedures may allow a customer to set up a customer account, including a username and a password, with the selected home NAP/NSP 672. The proposed procedures may also allow the home NAP/NSP 672 to configure the terminal 332 with the latest version of the operator-controlled NAP/NSP record lists 674 the first time that the terminal 332 establishes a connection with the home NAP/NSP 672. Moreover, the proposed procedures may allow a customer to easily add NAP(s)/NSP(s) to the user-controlled NAP/NSP record lists 562. Additionally, the proposed procedures may allow the customer to change the home NAP/NSP 672 with flexibility.

Exemplary Over-the-Air Service Provisioning

The present disclosure also relates to techniques for over-the-air service provisioning. Service provisioning is one of the prerequisites before the customer can properly use the services provided by a wireless communication network (e.g., a mobile WiMAX network). As discussed above, service provisioning may involve configuring the terminal with an NAP record list, an NSP record list, other service-related parameters (e.g., an IP address), a sign-on identify (e.g., in the format of username@domainname.com), etc.

One approach for service provisioning is to configure the terminal when the customer purchases the terminal in the retail store or the sale office of the service provider. However, this method is neither flexible nor optimal. The NAP/NSP record lists may change often, and therefore the terminal may not have the latest version when the customer starts to access the network. Also, configuring the terminal with an IP address when the customer purchases the terminal wastes IP address resources before the customer actually uses the IP service. Finally, the customer may desire to choose the sign-on identity freely.

The present disclosure proposes that a customer be allowed to activate the service and configure the service provisioning information when the customer first uses the terminal to access the network. The present disclosure describes over-the-air service provisioning (OTASP) procedures to allow the network to activate the service and transfer all the service provisioning information to the terminal, and to allow the customer to choose the sign-on identity.

The over-the-air service provisioning techniques disclosed herein may be applicable to a terminal that is configured for operation in a wireless communication network that supports an Institute of Electronic and Electrical Engineers (IEEE) 802.16 standard. However, scope of the present disclosure should not be limited to IEEE 802.16; the techniques disclosed herein may be useful in other types of wireless communication networks as well.

Figure 10:
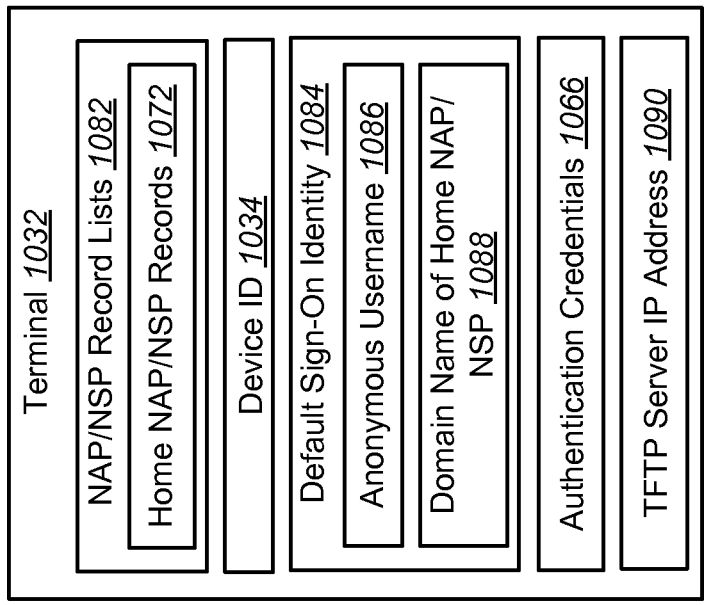
FIG. 10 illustrates how a terminal may be configured in accordance with the present disclosure after a customer has signed a contract with a Network Access Provider (NAP) and/or a Network Service Provider (NSP)

Reference is now made to FIG. 10. FIG. 10 illustrates how a terminal 1032 may be configured in accordance with the present disclosure after a customer has signed a contract with an NAP and/or an NSP. The entity (or entities) with whom the customer has signed the contract (or contracts) will be referred to as the home NAP/NSP.

In accordance with the present disclosure, when a customer purchases a terminal 1032 and signs a contract with a home NAP/NSP (e.g., in a retail store or a sale office of the home NAP/NSP), the terminal 1032 may only be provisioned with a minimum amount of information. For example, although the terminal 1032 may be provisioned with NAP/NSP record lists 1082, the NAP/NSP record lists 1082 may only include records 1072 for the home NAP/NSP. The NAP/NSP record lists 1082 may not include records for any other NAPs/NSPs at this point.

The terminal 1032 may also be provisioned with a device identifier 1034 (e.g., a MAC address). The terminal 1032 may also be provisioned with a default sign-on identity 1084. The default sign-on identity 1084 may include an anonymous username 1086 and a domain name 1088 corresponding to the home NAP/NSP. The terminal 1032 may also be provisioned with authentication credentials 1066, i.e., credentials to authenticate the terminal 1032 and/or the customer.

The terminal 1032 may also be provisioned with an IP address 1090 of a Trivial File Transfer Protocol (TFTP) server. The IP address 1090 of the TFTP server may be used by the terminal 1032 for over-the-air service provisioning, as will be discussed below. Alternatively, instead of being provisioned with the IP address 1090 of the TFTP server, the terminal 1032 may obtain the IP address 1090 of the TFTP server in other ways, as will be discussed below.

Figure 11:
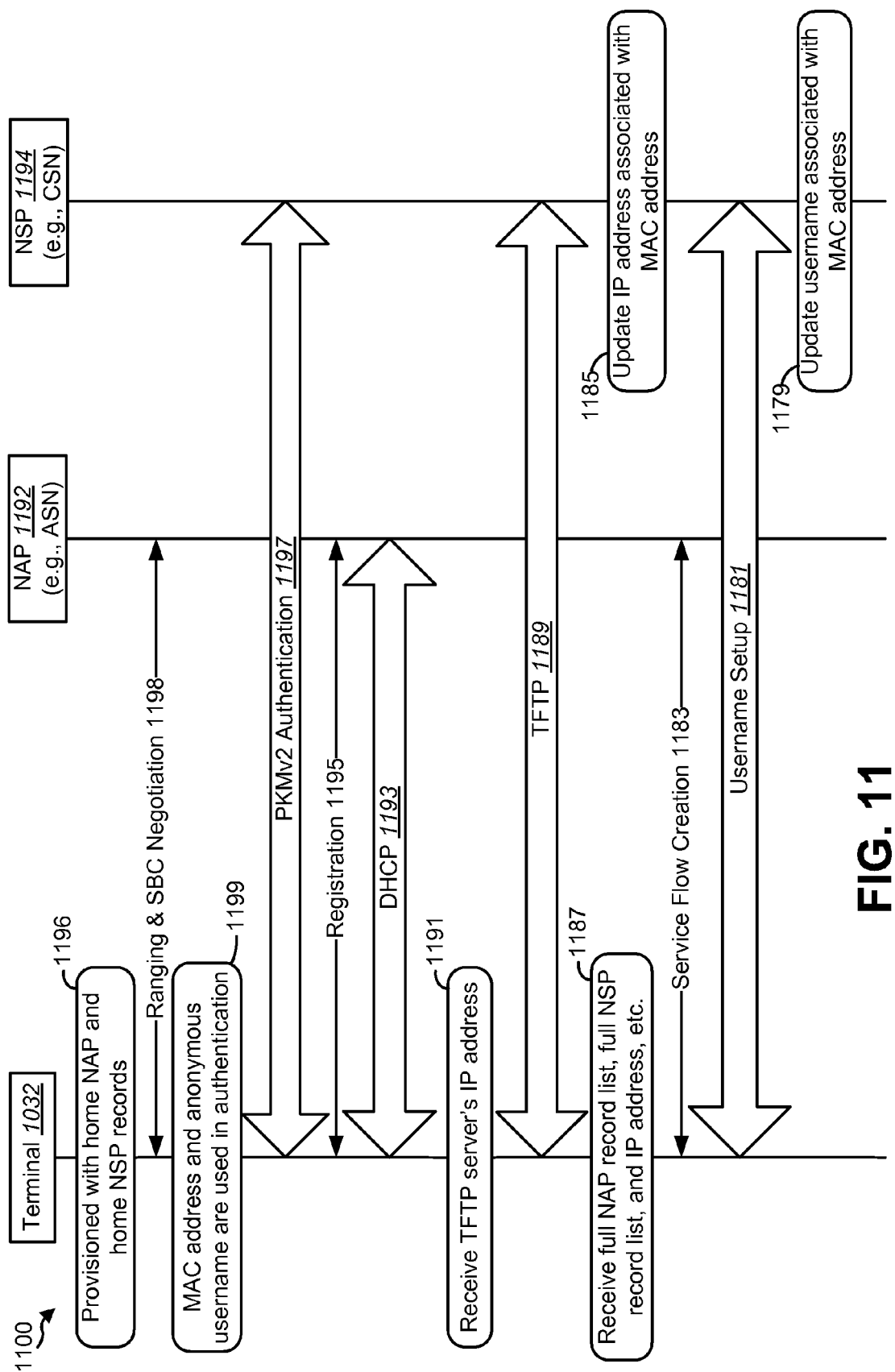
FIG. 11 illustrates an example of a method for over-the-air service provisioning in accordance with the present disclosure.

Reference is now made to FIG. 11. FIG. 11 illustrates an example of a method 1100 for over-the-air service provisioning in accordance with the present disclosure. The method 1100 involves a terminal 1032, the home NAP 1192, and the home NSP 1194. More specifically, the method 1100 may involve the Access Services Network (ASN) of the home NAP 1192 and the Connectivity Services Network (CSN) of the home NSP 1194.

As indicated above, the terminal 1032 may initially be provisioned 1196 with records 1072 for the home NAP/NSP 1192, 1194. When the customer first uses the terminal 1032, the terminal 1032 may scan for the home NAP/NSP 1192, 1194 using the home NAP/NSP records 1072 from the NAP/NSP record lists 1082. The terminal 1032 may automatically select the home NAP/NSP 1192, 1194 if the home NAP/NSP 1192, 1194 is in the terminal's 1032 coverage area. Otherwise, the terminal 1032 can provide a list of all possible NAPs/NSPs in the terminal's coverage area, and the customer may be allowed to choose the NAP/NSP that is used for over-the-air service provisioning.

After selection of an NAP/NSP for over-the-air service provisioning, the terminal 1032 may perform initial network entry procedures. These network entry procedures may include ranging and subscriber basic capability (SBC) negotiation 1198, followed by authentication. The device identifier 1034 (e.g., MAC address) and anonymous username 1086 which the terminal 1032 has been provisioned with may be used 1199 during authentication.

Authentication 1197 may be performed in accordance with the Privacy Key Management protocol, version 2 (PKMv2). During PKMv2 authentication 1197, Extensible Authentication Protocol (EAP) messages for authentication may be forwarded to the Authentication, Authorization, and Accounting (AAA) server of the home NSP 1194 based on domain name information 1088 that is provided by the terminal 1032 in accordance with the EAP protocol. The AAA server of the home NSP 1194 may perform mutual authentication with the terminal 1032 based on the terminal's device identifier 1034 (e.g., MAC address). After successful authentication 1197, the home NAP/NSP 1192, 1194 may start to activate the service, and billing can start.

The terminal 1032 and the home NAP 1192 may perform registration 1195. The terminal 1032 may set up IP connectivity for management by requesting 1193 a management IP address from the home NAP 1192 using the Dynamic Host Configuration Protocol (DHCP). The terminal 1032 may receive 1191 the IP address 1090 of the TFTP server from a DHCP server, which may be part of the home NAP 1192. The DHCP server may include the IP address 1090 of the TFTP server in the DHCP Option field in the DHCPOFFER or DHCPACK packets.

The terminal 1032 may contact 1189 the TFTP server, which may be part of the home NSP 1194, to download the service provisioning information. As indicated above, the terminal 1032 may be pre-configured with the IP address 1090 of the TFTP server, or the IP address 1090 of the TFTP server may be acquired during the DHCP protocol, as just described. Since the terminal 1032 may roam to the coverage area of other NAPs, the DHCP server of a visited NSP may need to request the home NSP 1194 to send the IP address 1090 of the TFTP server of the home NSP 1194 based on the domain name information 1088 that is provided by the terminal 1032. After the terminal 1032 receives 1187 the service provisioning information, the terminal 1032 can start to use the new provisioning information. The home NSP 1194 may update 1185 the IP address that is associated with the device identifier 1034 (e.g., MAC address). The file(s) in the TFTP download may include the latest versions of the complete NAP/NSP record lists and the IP address.

The terminal 1032 may create 1183 the service flow and set up the IP data communication using the new IP address. The new IP address may be a mobile IP address, a simple IP address, an IPv6 address, etc. At this point, the terminal 1032 may prompt the customer to set up 1181 the username. Once the customer's selection of the username has been received, the terminal 1032 may then connect to the home NSP 1194 to send the new username associated with the device identifier 1034 (e.g., MAC address). The home NSP 1194 may verify the uniqueness of the username, and update 1179 the username that is associated with the device identifier 1034.

The over-the-air service provisioning techniques described above may provide a number of advantages relative to known approaches. For example, the techniques disclosed herein may allow NAPs/NSPs to provision the terminal with minimal service provisioning information to allow flexibility. In addition, the techniques disclosed herein may allow NAPs/NSPs to configure the terminal with the latest and most complete service provisioning information during the first time that the customer accesses the network. The techniques disclosed herein may also allow the customer to set up the username during the first time that the customer accesses the network.

Figure 12:
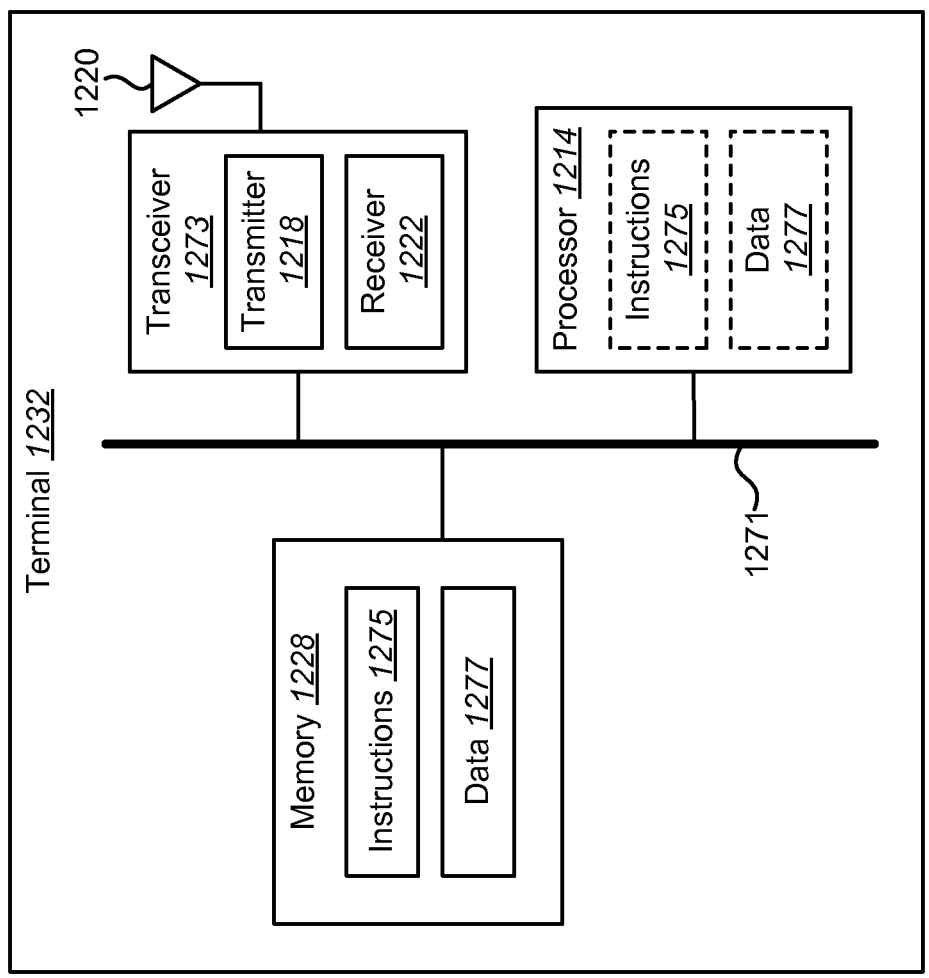
FIG. 12 illustrates certain components that may be included within a terminal that is configured in accordance with the present disclosure.

Reference is now made to FIG. 12. FIG. 12 illustrates certain components that may be included within a terminal 1232 that is configured in accordance with the present disclosure.

The terminal 1232 includes a processor 1214. The processor 1214 may be a general purpose single- or multi-chip microprocessor (e.g., an ARM), a special purpose microprocessor (e.g., a digital signal processor (DSP)), a microcontroller, a programmable gate array, etc. The processor 1214 may be referred to as a central processing unit (CPU). Although just a single processor 1214 is shown in the terminal 1232 of FIG. 12, in an alternative configuration, a combination of processors (e.g., an ARM and DSP) could be used.

The terminal 1232 also includes memory 1228. The memory 1228 may be any electronic component capable of storing electronic information. The memory 1228 may be embodied as random access memory (RAM), read only memory (ROM), magnetic disk storage media, optical storage media, flash memory devices in RAM, on-board memory included with the processor, EPROM memory, EEPROM memory, registers, and so forth, including combinations thereof.

Data 1277 and instructions 1275 may be stored in the memory 1228. The instructions 1275 may be executable by the processor 1214 to implement the methods disclosed herein. Executing the instructions 1275 may involve the use of the data 1277 that is stored in the memory 1228.

The terminal 1232 may also include a transmitter 1218 and a receiver 1222 to allow transmission and reception of signals between the terminal 1232 and a remote location. The transmitter 1218 and receiver 1222 may be collectively referred to as a transceiver 1273. An antenna 1220 may be electrically coupled to the transceiver 1273. The terminal 1232 may also include (not shown) multiple transmitters, multiple receivers, multiple transceivers and/or multiple antenna.

The various components of the terminal 1232 may be coupled together by one or more buses, which may include a power bus, a control signal bus, a status signal bus, a data bus, etc. For the sake of clarity, the various buses are illustrated in FIG. 12 as a bus system 1271.

In the above description, reference numbers have sometimes been used in connection with various terms. Where a term is used in connection with a reference number, this is meant to refer to a specific element that is shown in one or more of the Figures. Where a term is used without a reference number, this is meant to refer generally to the term without limitation to any particular Figure.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements. The terms "instructions" and "code" may be used interchangeably herein.

The functions described herein may be implemented in hardware, software, firmware, or any combination thereof. If implemented in software, the functions may be stored as one or more instructions on a computer-readable medium. The term "computer-readable medium" refers to any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 8 and 10, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. An open service provisioning method, the method being implemented by a terminal, the method comprising:
   receiving a customer's selection of a first-time network access provider and network service provider (NAP/NSP);
   establishing an over the air connection with the first-time NAP/NSP, wherein connecting to the first-time NAP/NSP comprises providing an identifier having a reserved domain name and a top-level domain name, wherein the reserved domain name causes the first-time NAP/NSP to bypass authentication;
   receiving information about possible NAPs/NSPs via the over the air connection with the first-time NAP/NSP and before signing up for service with one of the possible NAPs/NSPs;
   receiving the customer's selection of a home NAP/NSP from the possible NAPs/NSPs;
   assisting the customer to sign up for service with the home NAP/NSP; and
   establishing a connection with the home NAP/NSP.

2. The method of claim 1, wherein the method is performed the first time that the customer uses the terminal.

3. The method of claim 1, further comprising creating user-controlled NAP/NSP record lists based on customer input.

4. The method of claim 1, further comprising downloading operator-controlled NAP/NSP record lists from the home NAP/NSP.

5. The method of claim 1, further comprising receiving authentication credentials and payment information from the customer for the home NAP/NSP.

6. A terminal configured for open service provisioning, comprising:
 a processor;
 memory in electronic communication with the processor;
 instructions stored in the memory, the instructions being executable by the processor to:
  receive a customer's selection of a first-time network access provider and network service provider (NAP/NSP);
  establish an over the air connection with the first-time NAP/NSP, wherein connecting to the first-time NAP/NSP comprises providing an identifier having a reserved domain name and a top-level domain name, wherein the reserved domain name causes the first-time NAP/NSP to bypass authentication;
  receive information about possible NAPs/NSPs via the over the air connection with the first-time NAP/NSP and before signing up for service with one of the possible NAPs/NSPs;
  receive the customer's selection of a home NAP/NSP from the possible NAPs/NSPs;
  assist the customer to sign up for service with the home NAP/NSP; and
  establish a connection with the home NAP/NSP.

7. The terminal of claim 6, wherein the recited acts are performed the first time that the customer uses the terminal.

8. The terminal of claim 6, wherein the instructions are also executable to create user-controlled NAP/NSP record lists based on customer input.

9. The terminal of claim 6, wherein the instructions are also executable to download operator-controlled NAP/NSP record lists from the home NAP/NSP.

10. The terminal of claim 6, wherein the instructions are also executable to receive authentication credentials and payment information from the customer for the home NAP/NSP.

11. A terminal configured for open service provisioning, comprising:
 means for receiving a customer's selection of a first-time network access provider and network service provider (NAP/NSP);
 means for establishing an over the air connection with the first-time NAP/NSP, wherein connecting to the first-time NAP/NSP comprises means for providing an identifier having a reserved domain name and a top-level domain name, wherein the reserved domain name causes the first-time NAP/NSP to bypass authentication;
 means for receiving information about possible NAPs/NSPs via the over the air connection with the first-time NAP/NSP and before signing up for service with one of the possible NAPs/NSPs;
 means for receiving the customer's selection of a home NAP/NSP from the possible other NAPs/NSPs;
 means for assisting the customer to sign up for service with the home NAP/NSP; and
 means for establishing a connection with the home NAP/NSP.

12. The terminal of claim 11, further comprising means for creating user-controlled NAP/NSP record lists based on customer input.

13. The terminal of claim 11, further comprising means for downloading operator-controlled NAP/NSP record lists from the home NAP/NSP.

14. The terminal of claim 11, further comprising means for receiving authentication credentials and payment information from the customer for the home NAP/NSP.

15. A computer-program product for open service provisioning by a terminal, the computer-program product comprising a non-transitory computer-readable medium having instructions thereon, the instructions comprising:
 code for receiving a customer's selection of a first-time network access provider and network service provider (NAP/NSP);
 code for establishing an over the air connection with the first-time NAP/NSP, wherein connecting to the first-time NAP/NSP comprises code for providing an identifier having a reserved domain name and a top-level domain name, wherein the reserved domain name causes the first-time NAP/NSP to bypass authentication;
 code for receiving information about possible NAPs/NSPs via the over the air connection with the first-time NAP/NSP and before signing up for service with one of the possible NAPs/NSPs;
 code for receiving the customer's selection of a home NAP/NSP from the possible NAPs/NSPs;
 code for assisting the customer to sign up for service with the home NAP/NSP; and
 code for establishing a connection with the home NAP/NSP.

16. The computer-program product of claim 15, wherein the instructions also comprise code for creating user-controlled NAP/NSP record lists based on customer input.

17. The computer-program product of claim 15, wherein the instructions also comprise code for downloading operator-controlled NAP/NSP record lists from the home NAP/NSP.

18. The computer-program product of claim 15, further comprising code for receiving authentication credentials and payment information from the customer for the home NAP/NSP.

19. An over-the-air service provisioning method, the method being implemented by a terminal, the method comprising:
 selecting from a list of possible network access providers and network service providers in a coverage area of the terminal, a network access provider and network service provider (NAP/NSP), other than a home NAP/NSP, for over-the-air service provisioning;
 performing initial network entry procedures with the NAP/NSP selected for over-the-air service provisioning, wherein the initial entry procedures comprise providing an identifier having a reserved domain name and a top-level domain name, wherein the reserved domain name causes the NAP/NSP selected for over-the-air service provisioning to bypass authentication;
 receiving, over the air and from the NAP/NSP selected for over-the-air service provisioning, service provisioning information that comprises NAP/NSP record lists;
 receiving an Internet Protocol (IP) address;
 using the service provisioning information to create a service flow; and
 using the IP address to establish IP data communication;
 wherein the method is performed the first time that a customer uses the terminal.

20. The method of claim 19, wherein after the service flow is created, the method further comprises:
  receiving the customer's selection of a username; and
  notifying the home NAP/NSP about the selected username.

21. The method of claim 19, wherein the IP address is received from a Trivial File Transfer Protocol (TFTP) server.

22. The method of claim 19, wherein the service provisioning information is received from a Trivial File Transfer Protocol (TFTP) server.

23. A terminal configured for over-the-air service provisioning, comprising:
  a processor;
  memory in electronic communication with the processor;
  instructions stored in the memory, the instructions being executable by the processor to:
    select from a list of possible network access providers and network service providers in a coverage area of the terminal, a network access provider and network service provider (NAP/NSP), other than a home NAP/NSP, for over-the-air service provisioning;
    perform initial network entry procedures with the NAP/NSP selected for over-the-air service provisioning, wherein the initial entry procedures comprise providing an identifier having a reserved domain name and a top-level domain name, wherein the reserved domain name causes the NAP/NSP selected for over-the-air service provisioning to bypass authentication;
    receive, over the air and from the NAP/NSP selected for over-the-air service provisioning, service provisioning information that comprises NAP/NSP record lists;
    receive an Internet Protocol (IP) address;
    use the service provisioning information to create a service flow; and
    use the IP address to establish IP data communication;
  wherein the recited acts are performed the first time that a customer uses the terminal.

24. The terminal of claim 23, wherein after the service flow is created, the instructions are also executable to:
  receive the customer's selection of a username; and
  notify the home NAP/NSP about the selected username.

25. The terminal of claim 23, wherein the IP address is received from a Trivial File Transfer Protocol (TFTP) server.

26. The terminal of claim 23, wherein the service provisioning information is received from a Trivial File Transfer Protocol (TFTP) server.

27. A terminal configured for over-the-air service provisioning, comprising:
  means for selecting from a list of possible network access providers and network service providers in a coverage area of the terminal, a network access provider and network service provider (NAP/NSP), other than a home NAP/NSP, for over-the-air service provisioning;
  means for performing initial network entry procedures with the NAP/NSP selected for over-the-air service provisioning, wherein the initial entry procedures comprise providing an identifier having a reserved domain name and a top-level domain name, wherein the reserved domain name causes the NAP/NSP selected for over-the-air service provisioning to bypass authentication;
  means for receiving, over the air and from the NAP/NSP selected for over-the-air service provisioning, service provisioning information that comprises NAP/NSP record lists;
  means for receiving an Internet Protocol (IP) address;
  means for using the service provisioning information to create a service flow; and
  means for using the IP address to establish IP data communication;
  wherein the recited acts are performed the first time that a customer uses the terminal.

28. The terminal of claim 27, further comprising:
  means for receiving the customer's selection of a username after the service flow is created; and
  means for notifying the home NAP/NSP about the selected username.

29. A computer-program product for over-the-air service provisioning by a terminal, the computer-program product comprising a non-transitory computer-readable medium having instructions thereon, the instructions comprising:
  code for selecting from a list of possible network access providers and network service providers in a coverage area of the terminal, a network access provider and network service provider (NAP/NSP), other than a home NAP/NSP, for over-the-air service provisioning;
  code for performing initial network entry procedures with the NAP/NSP selected for over-the-air service provisioning, wherein the initial entry procedures comprise providing an identifier having a reserved domain name and a top-level domain name, wherein the reserved domain name causes the NAP/NSP selected for over-the-air service provisioning to bypass authentication;
  code for receiving, over the air and from the NAP/NSP selected for over-the-air service provisioning, service provisioning information that comprises NAP/NSP record lists;
  code for receiving an Internet Protocol (IP) address;
  code for using the service provisioning information to create a service flow; and
  code for using the IP address to establish IP data communication;
  wherein the recited acts are performed the first time that a customer uses the terminal.

30. The computer-program product of claim 29, wherein the instructions further comprise:
  code for receiving the customer's selection of a username after the service flow is created; and
  code for notifying the home NAP/NSP about the selected username.

* * * * *